Figure 1:
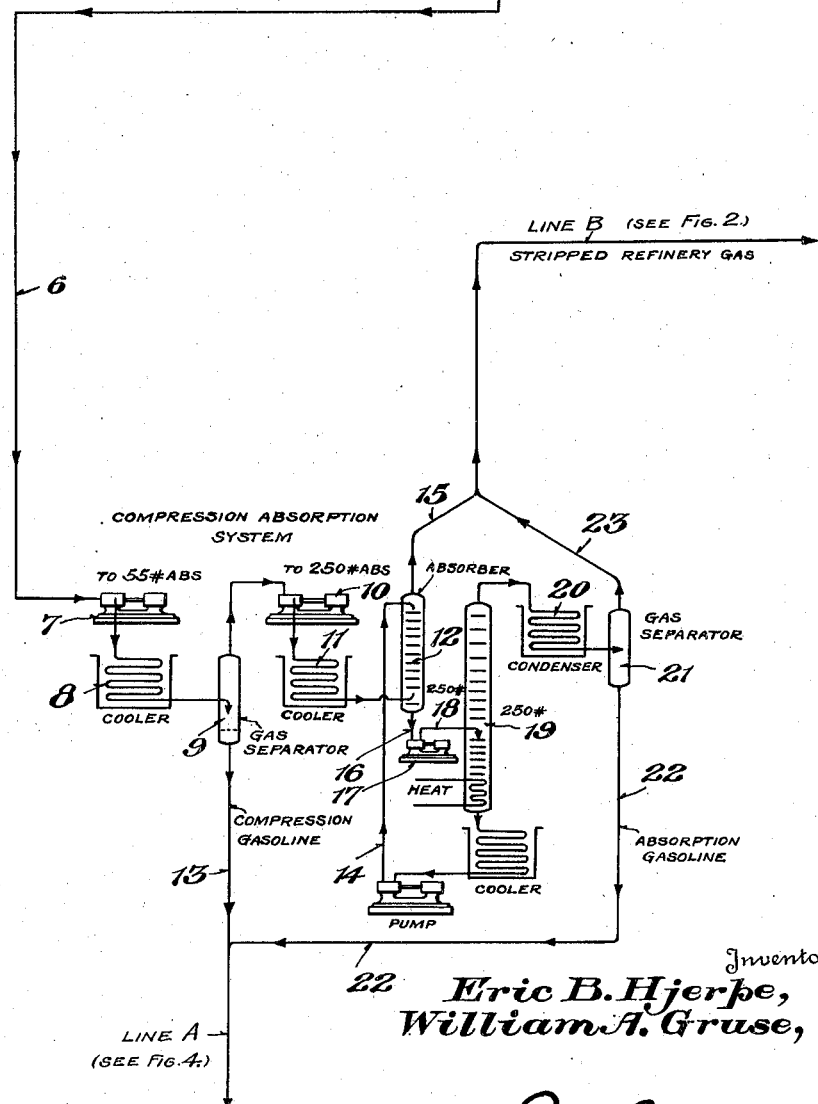

Nov. 16, 1937.  E. B. HJERPE ET AL  2,099,480
PROCESS OF MANUFACTURING PROPYL CHLORIDE
Filed May 26, 1932   3 Sheets-Sheet 1

Inventors
*Eric B. Hjerpe,*
*William A. Gruse,*
By *K. P. McElroy* Attorney

Nov. 16, 1937.  E. B. HJERPE ET AL  2,099,480
PROCESS OF MANUFACTURING PROPYL CHLORIDE
Filed May 26, 1932  3 Sheets-Sheet 3
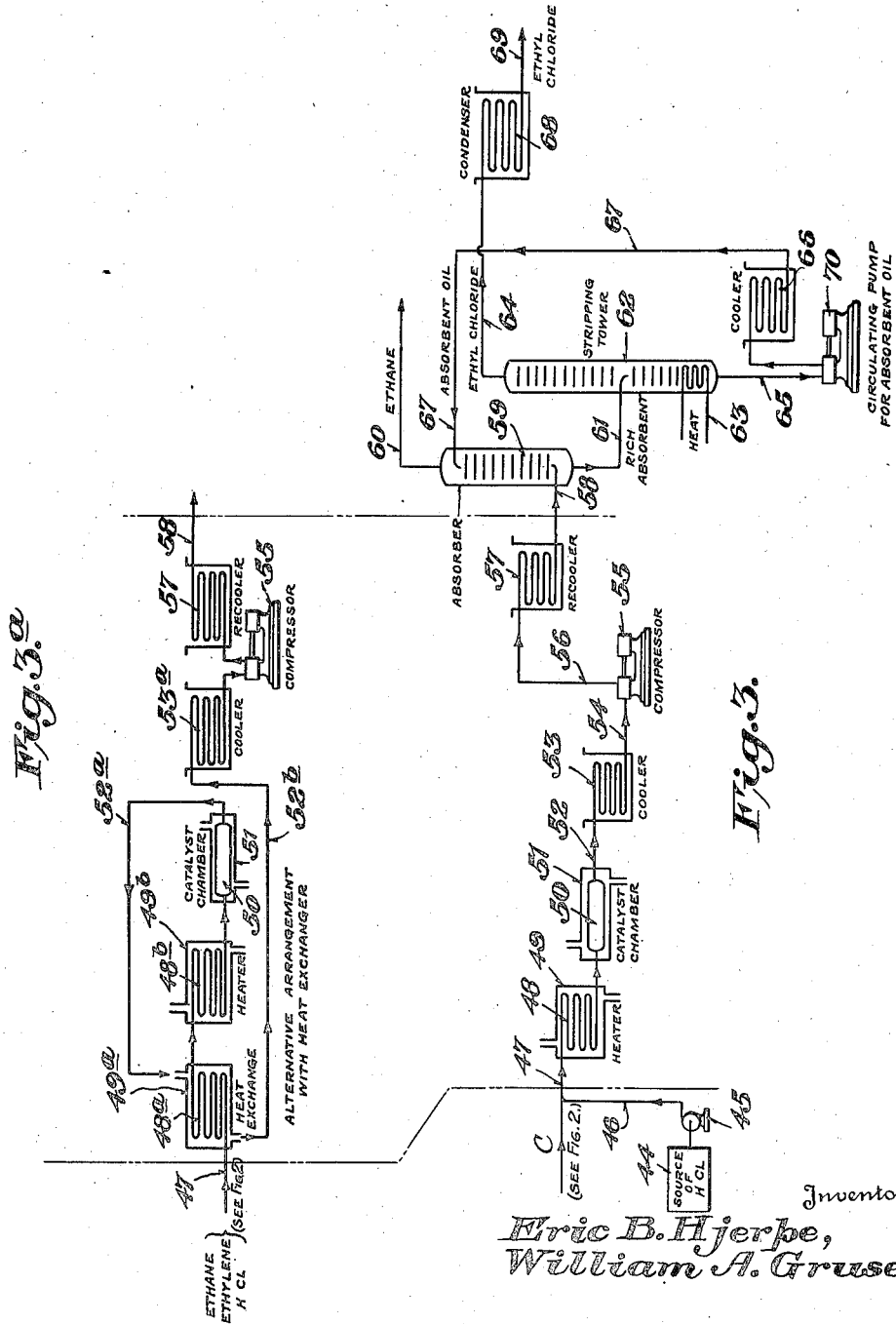
Inventors
Eric B. Hjerpe,
William A. Gruse,
By K. P. McElroy
Attorney Patented Nov. 16, 1937

2,099,480

UNITED STATES PATENT OFFICE 2,099,480

PROCESS OF MANUFACTURING PROPYL CHLORIDE

Eric B. Hjerpe, Pittsburgh, and William A. Gruse, Wilkinsburg, Pa., assignors, by mesne assignments, to Gulf Oil Corporation, a corporation of Pennsylvania Application May 26, 1932, Serial No. 613,774

6 Claims. (Cl. 260—166)

This invention relates to utilization of petroleum refinery gas and apparatus therefor, and in its process phases it constitutes a continuous process wherein refinery gas containing methane, ethylene, ethane, propylene, propane, butylene, butane, and pentanes and higher boiling constituents is stripped of its contained gasoline vapor (pentanes and higher boiling components) and most of its butanes, for purposes hereinafter described; wherein the residue is next stripped of methane for conversion into methyl chloride or otherwise usefully disposed of; wherein the residue from the last mentioned separation is further subjected to successive fractionation for isolation of cuts containing one olefin each (namely ethylene, propylene, and any residue of butylene); wherein the fraction containing ethylene is contacted with hydrogen chloride, or bromine or other reagents in the presence of a catalyst, for conversion of ethylene into ethyl chloride, ethylene dibromide, etc., and the product separately recovered from its diluent gas; wherein the fraction containing propylene is contacted with hydrogen chloride in the presence of a catalyst, for conversion of propylene into propyl chloride, and the propyl chloride separately recovered, or wherein the propylene is otherwise converted to useful chemical derivatives; and wherein the mixture of butanes and pentanes and higher boiling components first stripped from the refinery gas, or a light fraction thereof, is combined with the residual butylene fraction and the combined material is subjected to high heat and pressure, with or without the presence of a catalyst, for polymerization into compounds boiling within the boiling point range of gasoline and suitable for blending therewith.

More specifically, in its process phases, this invention relates to a continuous process wherein uncondensed gas from the customary water cooled condensers of petroleum cracking stills and/or coke stills and/or steam stills (said gas comprising methane, ethylene, ethane, propylene, propane, butylene, butane, and higher boiling components) is subjected to compression and/or absorption steps to liquefy and thereby separate and remove butane and butylene and all higher boiling constituents, leaving a residue of stripped refinery gas; wherein this stripped refinery gas is chilled to a temperature sufficient to liquefy all higher boiling components than methane and is introduced into a tower and the methane fractionated out, the necessary chilling of the gas being effected by expanding it through an expansion valve after compressing it to the necessary degree and cooling it with water; wherein the liquid residue from the last mentioned tower is expanded into a second tower and the ethylene and ethane similarly fractionated out for a purpose herein later described; wherein the liquid residue of the last mentioned separation, now freed of ethylene, ethane and methane, is expanded into a fractionating tower and the propylene and propane fractionated out from residual butylene and butane, for the further separate use of each of these fractions as hereinafter described; wherein the separated ethylene and ethane fraction is contacted with hydrogen chloride in the presence of a catalyst such as aluminum chloride, to form ethyl chloride (the hydrogen chloride being furnished in volume equal to or slightly less than that of the ethylene) and the ethyl chloride is stripped from accompanying diluent by being scrubbed with and absorbed in a petroleum absorbent oil, and the ethyl chloride is finally isolated by distillation from the absorbent oil; wherein the propane and propylene fraction hereinbefore described is contacted with hydrogen chloride in reacting proportion, in the presence of a catalyst such as stannic chloride, to form propyl chloride; wherein the catalyst for the propylene-hydrogen chloride reaction is used in solution in propyl chloride and the gases for the reaction are scrubbed with this mixture, and the propyl chloride produced by the reaction also enters into solution in this same mixture; wherein the mixture of propyl chloride and catalyst is removed from the place of the reaction and warmed to the extent necessary for vaporization of a part of the propyl chloride and the latter is distilled therefrom and thereby separately obtained and the residue is returned to the presence of the reacting components for further use therewith; wherein the gas leaving the reaction chamber is scrubbed with a petroleum absorbent oil and any absorbed propyl chloride vapor is distilled out of the absorbent oil and conducted to the point where the propyl chloride product is distilled off from the catalyst mixture; wherein the mixture of butane, butylene, and higher boiling constituents separated out in the compression and/or absorption steps hereinbefore described, or a low boiling fraction of that mixture, together with residual butylene and butane from the propylene fractionation, is exposed to a temperature of the order of about 350° C. while being maintained under high pressure, to polymerize the so treated material to higher boiling point compounds and to reduce its tendency to form and deposit gum; and wherein the velocity of the polymerization step may be increased by the presence of a catalyst such as fuller's earth during the treatment at high temperature under high pressure; wherein the methane fractionated out as hereinbefore described and the residual ethane may or may not be further utilized; and wherein the tail gas from the manufacture of propyl chloride may or may not be scrubbed with water for removal of any free hydrogen chloride and disposed of as commercial propane; and wherein the tail gas from the before described polymerization of butylene, etc. may or may not be utilized as commercial butane.

One object of our invention is to economically produce useful commercial products from petroleum refinery gas.

Another object of our invention is to convert petroleum refinery gas into products of maximum commercial value. Another object of our invention is to convert the ethylene content of the gas into ethyl chloride, and capture a maximum of the chloride so produced, while keeping the separatory processes to simplest possible form.

Another object of our invention is to convert the propylene content of the gas into propyl chloride, and capture a maximum of the chloride so produced, while keeping the separatory processes to simplest possible form.

Another object of our invention is to provide new and useful combinations of simple and cheap methods of obtention of intermediate products, with simple and cheap methods of conversion of those intermediate products into commercially valuable end products, with simple and cheap methods of capturing those end products.

The accompanying drawings illustrate the invention and bear such brief memoranda as will attain the advantages of a flow sheet.

Referring to the drawings, in Fig. 1 the numeral 1 indicates a stream of charging stock to a conventional cracking still comprising cracking coil 2, separating and dephlegmating tower 3, condenser 4, and separator 5. These elements do not constitute a portion of this invention but are included for clarity of presentation. After condensation of cracked distillate in the condenser 4 the distillate is separated from accompanying uncondensed gas in separator 5. This gas, conducted away through line 6, is raw material used in the process which constitutes our invention. Other raw material for our process is the corresponding uncondensed gas from petroleum coking stills, lubricating stills, and steam stills. Any one of these gases along or any mixture of them is acceptable raw material and this raw material will hereinafter be referred to as still gas, or petroleum refinery gas.

The first step in the process which we have invented is to strip the gas of butylene, butane, pentanes and all high boiling constituents, at least a portion of which will be subjected to further steps as hereinafter described. This separation may be effected in various ways and we have found compression and absorption methods very satisfactory, with subsequent controlled fractionation of the absorbed material. Absorption is most effective when we maintain a superatmospheric pressure of the order of 250 pounds or 300 pounds in the absorber. The compression can be effected in two stages as shown in the drawings with recooling of the gas after each compression stage. This compression and subsequent cooling will liquefy some of the higher boiling constituents of the gas and so a separator is placed in the line which conducts the cooled gas from one compression stage to another compressor. Liquefied material removed from this separator is termed compression gasoline and its subsequent treatment will be hereafter described. The drawing, lower part of Fig. 1, depicts two stage compression with compressors 7 and 10, followed by recooling in coolers 8 and 11 respectively, and removal of compression gasoline at separator 9, positioned immediately before the second compressor. The compression gasoline is conducted away from separator 9 through line 13. After compression to the desired degree, and subsequent recooling as described, the gas is introduced into an absorber 12 where it flows countercurrent to and in open contact with a stream of absorbent oil introduced thereinto through line 14. The absorbent oil absorbs most of the butane and practically all higher boiling constituents of the gas, and the remainder of the gas, which we shall term stripped refinery gas, leaves the absorber through line 15. The presence of plates in the absorber adds greatly to its effectiveness. The absorbent oil, rich with dissolved constituents of the gas, leaves the bottom of absorber 12 through line 16 and is introduced through line 18 into a tower 19 where the absorbed constituents of the gas are distilled off and fractionated. Tower 19 is preferably operated under a superatmospheric pressure and should its pressure not be sufficiently below that of the absorber to cause the necessary flow through lines 16 and 18, a pump 17 can be inserted in the line to effect the transfer of the liquid. Heat for distilling the absorbed constituents of the gas out of the absorbent oil in tower 19 is provided by a closed steam coil or equivalent heating means in the lower portion of the tower. The upper portion of tower 19 is designed to effect clean fractionation of the absorbed material from the absorbent and the so fractionated vapors from tower 19 pass to, and are condensed by, condenser 20. The effluent of the condenser passes to gas separator 21 where any unliquefied components of the gas are separated from the liquefied components. The condenser 20 and gas separator 21 are maintained under the same pressure and the pressure and temperature of the condenser are chosen to assure liquefaction of the highest possible proportion of the butane and butylene without liquefaction of propane or propylene. The butylene, butane, and higher boiling fractions of the refinery gas which are liquefied in condenser 20 and separated from accompanying gas in separator 21 are conducted away through line 22. This line 22 joins line 13, previously described, and the combined stream passes through line A to another portion of the process. That portion of the petroleum refinery gas which passes through condenser 20 without being liquefied therein passes out of the top of gas separator 21 through line 23. This line joins line 15, previously described, to form line B, and the combined stream in line B is termed stripped refinery gas. This stripped refinery gas contains some butylene and butane and all of the lower boiling constituents of the petroleum refinery gas. The relative proportions of the various constituents vary widely according to the kind of oil from which it originates, the kind of still in which it is produced, the temperature, pressure, and other conditions attending its creation, and the condensation of accompanying vapors in the still condenser (condenser 4 or its equivalent). One typical analysis of the stripped refinery gas—insofar as any analysis could be termed typical—was the following, observed in operation of the process herein described and claimed.

|  | Per cent |
|---|---|
| Methane | 45 |
| Ethylene | 5 |
| Ethane | 20 |
| Propylene | 8 |
| Propane | 15 |
| Butylene | 3 |
| Butane | 4 |

Figure 2:
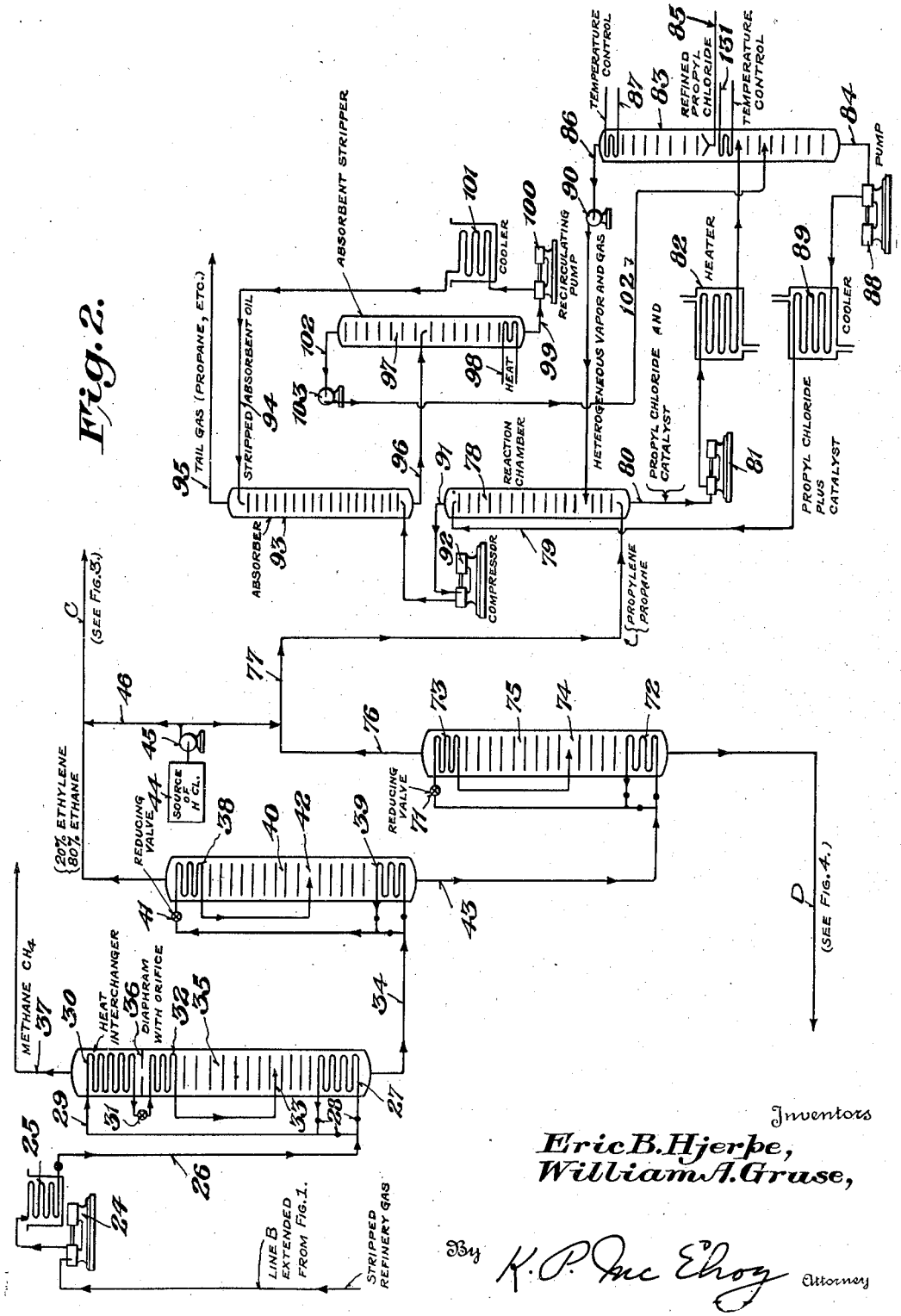

The stripped refinery gas is conducted by line B from that portion of the process depicted in Fig. 1 to that portion of the process which is depicted in Fig. 2, which will now be more fully described.

Referring to Fig. 2, the stripped refinery gas from the previously described portion of our process is received through line B, and our first step is to fractionate out the methane. We do this by introducing it at a sufficiently low temperature into a fractionating tower and the low temperature is obtained by self-cooling incident to expansion through an expansion valve or work engine. Further details follow. The stripped refinery gas from line B is compressed to whatever degree is necessary to effect that cooling at the expansion valve which is requisite for liquefaction at tower pressure of all constituents of the gas which boil at higher temperatures than methane. The tower pressure is advantageously chosen to permit further pressure drop in subsequent fractionating steps and yet maintain suitable working pressure at the last fractionating step. The methane is fractionated out in the first tower, 35, depicted in Fig. 2 and in our practice of the invention we have found a pressure of 500 pounds per square inch above atmospheric, before expansion, to be suitable for a gas such as the one of which an analysis is shown above, and a pressure of seven atmospheres within the tower to be quite satisfactory. This pressure is generated by compressor 24 and the heat generated in compression is removed from the gas by a cooler 25. The compressed and recooled gas is then in condition for chilling by expansion, for introduction into the tower at 33 and for fractionation therein. Expansion and consequent cooling is effected at expansion valve 31. Maintaining a pressure of seven atmospheres within this tower we take off the 45 per cent methane content of the gas with a tower head temperature of minus 140° C. and the remainder of the gas leaves the base of the tower in liquid form at a temperature of minus 60° C. The fractionation in the tower is more easily controllable if we have a chilling means in the tower head and a warming means in the tower base. These are readily provided for by closed coils 27 and 32 in the tower base and head, respectively, and by-pass connections in the incoming gas line, to admit of circulating this gas therethrough in such quantity as is necessary to obtain the required control. Three valves 28 are shown for permitting the use of regulated amounts of the unexpanded gas for controlling the temperature of the tower base and similar by-pass connection and valves are provided to permit the use of regulated amounts of the expanded gas for controlling the temperature of the tower head. The by-pass connection and valves 28 having been illustrated in connection with coil 27, their similar arrangement in connection with head coil 32 has been omitted from the drawings for simplicity of illustration. These same remarks apply as to the head coils in towers 40 and 75, each of which is provided with by-pass connections similar to coil 27, but which connections have been omitted from the drawings for simplicity of illustration. Immediately before expanding the gas through expansion valve 31 we may pass it through a heat interchanger 30 wherein it is cooled by heat interchange with methane leaving tower 35 at very low temperature. The heat interchanger may be superimposed upon tower 35, as depicted in Fig. 2, and communicate therewith through a pierced diaphragm 36. The methane finally flows away through line 37 for utilization.

The liquid residue leaves tower 35 through line 34 and comprises ethylene, ethane, propylene, propane, and some butylene and butane. This liquid is discharged into tower 40 at 42 for fractionation of ethylene and ethane from the propylene, propane, butylene, and butane. Tower 40 may be provided with coils 38 and 39 for assisting in controlling the head and base temperatures thereof, and these coils are connected with line 34 in by-pass arrangement and sequence as already fully described in connection with coils 27 and 32. A pressure of six atmospheres is maintained in tower 40 and the ethylene and ethane leave the top of the tower through line C at a temperature of minus 50° C., while the propylene, propane, butylene, and butane leave the base of the tower through line 43 at a temperature of minus 15° C. The head temperature of tower 40 is controlled correctly when the gaseous effluent exhibits substantially no absorption with sulfuric acid while giving a substantial bromine absorption.

Fig. 3 illustrates the further utilization of the ethylene-ethane fraction from tower 40. Hydrogen chloride from a source 44 is conveyed through line 46 to join the ethylene-ethane mixture in line C and the combined stream continues on as line 47. If the pressure of the hydrogen chloride at its source is insufficient to force it through line 46 its transfer may be effected by a rotary compressor 45 or equivalent means, or an ejector may be inserted in line C, at the junctiton with line 46, to induce adequate flow. The pressure of the gas in line C may be reduced prior to the junction of line 46 from hydrogen chloride source 44, or it may be reduced at a subsequent point, but in either case we reduce the pressure in the gas line prior to the catalyst chamber, so the pressure therein will be approximately atmospheric. Hydrogen chloride is used in the proportion of 36.5 parts (or very slightly less) by weight to 28 parts of ethylene. This corresponds to one volume (or very slightly less) of hydrogen chloride to one volume of ethylene. The mixture of ethylene, ethane, and hydrogen chloride from line 47 is then brought to the desired temperature and introduced into the presence of a catalyst, resulting in the prompt generation of ethyl chloride. Anhydrous aluminum chloride is an effective chlorination catalyst for this purpose and other chlorides have been found satisfactory. We find that our process can be practically and profitably conducted with gaseous mixtures in which the ethylene content of the ethylene-ethane mixture is even less than ten per cent although we prefer to not operate on gases much poorer in ethylene than ten per cent. The gas analysis already recorded is common and it will be noted that the ethylene content of the ethylene-ethane mixture in this particular gas is twenty per cent. The great dilution of the ethylene is one of the two factors which make the utilization of this fraction a difficult problem, for it results in an extremely dilute ethyl chloride which must then be separately recovered.

Referring again to Fig. 3, the mixture of ethylene, ethane, and hydrogen chloride from line 47 is passed through a coil 48 situated in a heating chamber 49 and heated in its passage therethrough to a temperature of about 350° F. and it is then brought into the presence of catalyst in chamber 50, which latter is surrounded by a temperature maintaining device 51. A contact of from one to two minutes with the catalyst is ordinarily ample when using reasonably fresh catalyst. A temperature of 350° F. should not be exceeded when using very fresh aluminum chloride because of its tendency to sublime, but with use it seems to gradually convert into a double compound requiring higher temperature for its vaporization and we find that temperatures of 400° F. are then practicable. After one or two minutes the ethylene will have been converted to ethyl chloride and will exist as a vapor, in very dilute form, in mixture with ethane and any excess hydrogen chloride. The vapors and gases are next conducted by line 52 to a cooler 53, wherein their temperature is reduced to approximately atmospheric temperature. If hydrogen chloride has been used in such quantity as to result in free hydrogen chloride beyond the catalyst chamber 50 it is next removed in appropriate manner.

We have found that petroleum oils are good absorbents of ethyl chloride but under our conditions, have no substantial absorbent action toward the accompanying products of our reaction, and we have solved the difficult problem of recovering the ethyl chloride by the use of an absorption system wherein the gases are scrubbed with, and the ethyl chloride is absorbed in, a petroleum absorbent oil which has no substantial volatility in relation to that of ethyl chloride; the absorbent oil after scrubbing the gases and absorbing the ethyl chloride is sent to a stripping still and fractionator for removal of the ethyl chloride content; and finally the undiluted vapors of ethyl chloride may be separately condensed if desired in liquid form. In Fig. 3 we have illustrated an absorption tower 59 and we ordinarily operate this under a pressure of about fifty pounds above atmospheric, this pressure being secured by the aid of a compressor 55. The reaction products pass from cooler 53 to compressor 55 through line 54 and are discharged from the compressor through line 56. This line conveys them to a recooler 57 where the heat resulting from their compression is removed prior to their introduction into absorption tower 59. The ethyl chloride vapors and accompanying gas are introduced into the bottom of the absorption tower, as shown, and absorbent oil is introduced at the top through line 67 and fed down, as shown, in counterflow to the material being scrubbed. A series of plates in the absorber adds greatly to its effectiveness. After having had its ethyl chloride content removed by the absorbent oil, the tail gas—ethane—is discharged from the top of absorption tower 59 through line 60, and goes on for further utilization. Absorbent oil containing ethyl chloride is removed from the base of absorption tower 59 through line 61 and conveyed to the combined stripping still and fractionator 62 wherein it is heated by circulation of a hot fluid through a closed coil 63 and the ethyl chloride content is distilled out. The ethyl chloride vapors pass from the top of tower 62 through line 64 to condenser 68, and ethyl chloride is separately discharged therefrom through line 69. The pressure generated in absorption tower 59 by means of compressor 55 is advantageously continued through to condenser 68 so that the ethyl chloride can be condensed with the aid of water at commonly obtainable temperature. A circulating pump 70 withdraws stripped absorbent oil from the base of stripping still 62, through line 65, and discharges it through a recooler 66 and line 67 back into the top of the absorption tower 59.

Fig. 3a is an alternative arrangement of elements 47 to 53 of Fig. 3, as indicated. The process of Fig. 3a is primarily the process of Fig. 3, but is altered somewhat to permit of better utilization of available heat, and reduction in the amount of outside cooling agent required. Instead of one heating coil 48 in heater 49, as shown in Fig. 3, the invention of Fig. 3a provides two coils 48a and 48b in two heaters 49a and 49b. The gases from line 47 are first heated in coil 48a by the hot products of the reaction, conducted from catalyst chamber 50 to heater 49a through line 52a. After being heated in coil 48a by the hot reaction products, the gas from coil 48a goes to coil 48b situated in heater 49b and is there raised to the requisite temperature by any effective heating means. After giving up some of their heat in heater 49a the hot reaction products pass through line 52b to cooler 53a and are there cooled the same as in cooler 53 of Fig. 3. Otherwise the process of Fig. 3a is the same as the process of Fig. 3.

Returning to Fig. 2, a mixture of propylene, propane, butylene, and butane is removed from the base of tower 40 through line 43 under a pressure of six atmospheres. This is conveyed through line 43 to tower 75, and is expanded at expansion valve 71 prior to its introduction thereinto at 74. Tower 75 is provided with base coil 72 and head coil 73 similar to coils 27 and 32 of tower 35 and completely described in that connection. The contents of line 43 or a portion of them may be by-passed through coil 72 for regulation of the temperature of the tower base, and all or a portion of them, after expansion through valve 71, may be by-passed through coil 73 for regulation of the tower head temperature. As previously stated the by-pass connections for coil 73 have been omitted from the drawings for purpose of simplification. We operate tower 75 at a pressure of five atmospheres and maintain therein a head temperature of 0° C. and a base temperature of plus 35° C. Thereby we effect fractionation of the incoming stream and take off from the tower head, through line 76, a mixture of propylene and propane, and from the tower base we take off a residue of butylene and butane through line D. The butylene-butane fraction is conducted away through line D for further utilization.

We ordinarily use the propylene-propane fraction from tower 75 for manufacture of a propyl chloride, although our invention also comprehends its conversion into other useful chemical derivatives. When we manufacture a propyl chloride therefrom the propylene-propane fraction discharged from tower 75 through line 76 may be reduced in pressure by a reducing valve or other suitable means and is then joined by a stream of hydrogen chloride from a source 44. If the pressure of the hydrogen chloride at source 44 is not sufficient to cause its flow into line 76, a centrifugal compressor 45 or equivalent means may be used to force it. The difficulties attendant upon handling HCl in a compressor limit the pressure attainable at this point, and the pressure of the propylene-propane mixture in line 76 must be chosen to permit introduction of HCl at attainable pressure. A pressure of ten pounds above atmospheric in the reaction vessel is quite satisfactory and centrifugal type compressors can readily compress hydrogen chloride to that extent. We usually maintain a pressure of ten pounds above atmospheric in the reaction chamber. The combined stream of propylene, propane, and hydrogen chloride is conveyed through line 77 to the reaction chamber 78, where it comes in contact with a catalyst, and the reaction is accomplished. For catalyst in this reaction we prefer stannic chloride, but other chlorination catalysts, such as titanium tetrachloride, zirconium tetrachloride, bismuth chloride, and others are useful for the purpose. We prefer to use our catalyst dissolved or suspended in propyl chloride. We use the latter term to include either normal or iso-propyl chloride, or a mixture of these, while by "chlorination catalyst" we mean a catalyst capable of catalyzing the reaction between hydrogen chloride and ethylene or propylene to form the respective chlorides. We always conduct the reaction at a temperature below the boiling point of the product (35° C. at atmospheric pressure in the case of iso-propyl chloride) and on down to 0° C. The results are best in the neighborhood of the latter temperature. For reaction chamber 78 we use a vertical tower wherein the catalyst, dissolved in propyl chloride, flows counter to an ascending stream of gas from line 77. The presence of plates or some other form of packing in chamber 78 adds greatly to its effectiveness. The propylene and hydrogen chloride react in the presence of the catalyst and produce propyl chloride. Propane and other tail gases leave reaction chamber 78 through line 91 and the propyl chloride product goes into solution with the propyl chloride-catalyst mixture. Propyl chloride is recovered from fractionating tower 83 to which the propyl chloride and catalyst mixture is conducted through line 80 and heater 82. A pump 81 is inserted in line 80 if additional force is necessary to transfer the liquid from reaction chamber 78 to fractionating column 83. The heating in heater 82 is regulated to distil off a quantity of propyl chloride approximately equal to that being currently produced, thereby leaving a liquid residue of propyl chloride and catalyst for return to and re-use in reaction chamber 78. In column 83 propyl chloride is removed as a side-stream, propyl chloride-catalyst mixture is removed from the base of the tower through line 84, and any uncondensed vapor, together with gas which may have been in solution in the incoming stream, is taken off from the tower head through line 86. A coil or equivalent temperature controlling means 131 may be provided in column 83, below the point where propyl chloride is taken off, to prevent any catalyst being carried over. A similar temperature controlling element 87 in the tower head is useful in condensing out the propyl chloride. The propyl chloride-catalyst mixture is returned through line 84, pump 88, cooler 89, and line 79 to the top of reaction chamber 78 for re-use therein.

It is cooled in cooler 89 to proper temperature for conduct of the reaction, as previously described. Any vapor and gas leaving the top of tower 83 is conducted by line 86 and a blower or compressor 90 (if necessary) back to reaction chamber 78, where any contained propyl chloride will be captured. The return of lines 84 and 86 to reaction chamber 78 assures recapture at that point of any propyl chloride escaping from tower 83 through these lines, so tower 83 can be operated with consideration solely to the purity of the propyl chloride taken off through line 85. Tower 83 can of course be constructed as two towers in series, or as a simplified single tower, according to the importance attached to purity of the recovered product and to the loss of propyl chloride in the tail gas. When constructed as two separate towers heater 82 will discharge into the first tower, stream 84 will leave the base of the first tower, stream 85 will leave the base of the second tower, and stream 86 will leave the top of the second tower. In the case of a simplified single tower catalyst mixture leaves the base and all other products go to a condenser and separator.

The tail gases of the reaction chamber 78 have already been described as leaving through line 91. They may discharge from the system at that point, or they may be subjected to an absorption step for recapture of contained propyl chloride, as illustrated in Fig. 2. Referring to Fig. 2 the tail gas leaving reaction chamber 78 through line 91 is recompressed by compressor 92 and forced into the bottom of an absorber 93 where it is scrubbed by a counterfluent absorbent oil introduced at the top of the absorber through line 94. The scrubbed tail gas leaves the top of the absorber 93 through line 95 and is discharged from the system. The absorbent oil, enriched by absorbed material is withdrawn from the base of absorber 93 through line 96 and discharged into stripping tower 97, or equivalent means, for removal of its absorbed material. Reduction in pressure between absorber 93 and stripper 97 will effect a total or partial vaporization of the absorbed material in stripper 97 and its vaporization is completed by heat from a coil 98 in the base of stripping tower 97. Stripped absorbent from the base of stripping tower 97 is conducted away from the base of the tower by line 99 to recirculating pump 100, which pump forces it through a cooler 101 and back through line 94 for re-use in absorber 93. The material stripped from the absorbent oil in stripping tower 97 is conducted away from the head of the tower through line 102 and conducted to tower 83. A compressor or a blower 103 is interposed in the line to step up the pressure if necessary.

Theoretically this process should produce normal propyl chloride and iso-propyl chloride, but in practicing the invention we get a very good yield of iso-propyl chloride and do not find the normal chloride in measurable quantity. Either the normal or iso-propyl chloride is a satisfactory carrier for the catalyst and we ordinarily use the product of our process for this purpose.

The description of that portion of our process which is illustrated by Fig. 1 described the withdrawal of gasoline from separator 9 through line 13, the withdrawal of gasoline from separator 21 through line 22 and the joining of these two streams as line A. The description of that portion of our process which is illustrated by Fig. 2 describes the withdrawal of residual butane and butylene from tower 75 through line D.

The constitution of petroleum refinery gas will vary from time to time in a refinery and it will vary between different refineries according to the oil being operated upon and the specific conditions attending creation of the gas. Gases of different constitutions will have different thermodynamic properties and the cooling resulting from expansion of different gases will vary. Therefore the exact pressures and temperatures for fractionation and expansion stated herein may require alteration for specific gases. With the aid of standard tables of physical constants, the data herein given, and the application of the well known gas laws, anyone skilled in the art here dealt with can readily compute the proper conditions for a specific gas. Obviously, external cooling can be supplied to assist fractionation if necessary.

Obtention of a fairly concentrated stream of ethylene in line C (Figs. 2 and 3) for manufacture of ethyl chloride may also be effected by an alternative process which is a combination of fractionation and differential absorption steps. In a typical practice of this invention the gas operated upon was of the following analysis:

|  | Per cent |
|---|---|
| Air, etc | 1.0 |
| Methane and hydrogen | 30.9 |
| Ethylene | 6.1 |
| Ethane | 28.1 |
| Propylene | 7.7 |
| Propane | 14.3 |
| Iso-butane | 4.0 |
| Butylene | 4.8 |
| Normal butane | 3.1 |

We found only three principal apparatus elements necessary, namely, a fractionator, an absorber, and a flash tower. Incidental apparatus elements included compressors, heat exchangers, drip traps, condensers, and coolers. In this alternative process the gas is compressed to a pressure of about 500 pounds per square inch and cooled to about 100° F. Any condensate is removed from the gas stream and the gas is then introduced into the fractionator at a point about midway of its height. In the fractionator the gas is scrubbed with a stream of reflux which is introduced at the head of the tower, and all methane and ethylene, and some ethane, leave the head of the fractionator, while most of the ethane, and all of the higher boiling components, leave the base of the fractionator. The fractionator is operated under a pressure of about 500 pounds per square inch and the head temperature is about 25° F. and the base temperature about 100° F. The reflux material used is part of the final product of the flash tower (hereinafter described), the remainder of which is discharged into line C (Figs. 2 and 3): it averages about 15 per cent methane, 70 per cent ethylene and 15 per cent ethane. Reflux is used in the fractionating tower in the proportion of one pound of reflux to about four or five cubic feet of gas introduced, or thereabouts, and it is introduced at a temperature of about 15° F., which temperature explains the fact that the gases leave the top of the fractionator at a tempreature about seventy-five degrees lower than they enter. A source of heat is provided in the base of the fractionator to assist fractionation. The methane, ethylene, and ethane discharged from the top of the fractionator are next introduced into the base of an absorber, where they are scrubbed under a pressure of about 490 pounds per square inch and at a temperature of about 90° F. with a close cut absorption naphtha. Ordinarily we use one gallon of absorption naphtha to five cubic feet of gas. Methane is discharged from the top of the absorber as tail gas, and we send the enriched absorbent oil from the base of the absorber to a flash tower for removal of the absorbed ethylene. The rich absorbent oil is then warmed from about 90°, at which it leaves the absorber, to about 160°, at which latter temperature we introduce it into the flash tower. The flash tower is operated under a pressure of about two hundred pounds per square inch. A heating means is provided in the base of the flash tower to aid the distillation of ethylene from the absorbent, and a base temperature of about 225° F. has been quite satisfactory at the operating pressure, with the particular absorbent naphtha we have been using. From the top of the flash tower we discharge the desired ethylene-rich stream, which runs about 70 per cent ethylene, 15 per cent methane, and 15 per cent ethane. Part of this stream we use for reflux in the fractionator, as already described, and the remainder we discharge into line C (Fig. 2), prior to the junction of line 46 therewith. Other combinations of temperature and pressure can of course be used.

The liquid residue from the fractionator can be further processed as above to procure fractions containing propylene and butylene, separately, in high concentration.

Another mode of getting gas at line C (Fig. 2), prior to the junction of line 46 therewith, which will contain ethylene as the only olefin, comprises sequentially compressing the gas; cooling it with water; absorbing everything boiling higher than ethane, and as much of the ethane as possible; and then washing the unabsorbed gas with dilute sulfuric acid for removal of contained propylene.

Throughout the various fractionations and stripping steps in the process illustrated in Figs. 1, 2, and 3, we may improve the separation by discharging a portion of the more closely separated product of one tower back into the head of a previous tower, to constitute an open reflux stream therein.

Throughout the various steps of our process for utilizing petroleum refinery gas we can of course reduce the number of steps in fractionating out a cut containing any particular olefin when it does not disadvantageously affect the usefulness of adjacent fractions or where, under the particular circumstances, the adjacent fraction is not to be used. Likewise, where it does not affect the usefulness of adjacent fractions, we can fractionate to get the desired olefin as the principal content of a fraction, accompanied only by minimal quantities of the components having adjacent boiling points.

As a catalyst for production of propyl chloride from propylene, stannic chloride has the particular advantages that its use seems unaccompanied by tar-forming side reactions, and it is recovered unchanged.

In the appended claims we use the term "petroleum refinery gas" to mean a residual gas from a petroleum refinery, which gas is relatively lean in olefin content. Such a gas is that produced by coking stills, steam stills, lubricating stills, and typical cracking installations which involve the passage of a stream of oil through cracking coils. One typical gas of such nature is that of which an analysis is tabulated herein and which has an olefin content of 16%. As before stated herein the relative proportions of the various constituents vary widely according to the kind of still in which it is produced, the temperature and pressure, and other conditions attending its creation. While the analysis set out herein is of a typical gas, other gases of the same type may have a much lower olefin content, or may have even half again as great a content of olefins. We do not use the term petroleum refinery gas to mean the product which results from the cracking of such a gas as we have described. We do not use the term petroleum refinery gas to mean gas rich in olefins which is wholly or predominantly the product of a vapor phase cracking process; such gases being ordinarily characterized by more than 30% of olefin content, and obviously presenting a very different problem than the type of gases herein described.

What we claim is:—

1. The process of manufacturing a propyl chloride from petroleum refinery gas which comprises isolating a fraction containing the olefin propylene but not containing any other olefin in large amount, contacting the propylene containing fraction with hydrogen chloride in the presence of a catalyst consisting of stannic chloride, with consequent formation of propyl chloride; removing the propyl chloride product and any dissolved catalyst out of the presence of any components of the gas which have not entered into the reaction; and distilling off propyl chloride.

2. A process according to claim 1 in which the stannic chloride catalyst is dissolved in propyl chloride.

3. A process according to claim 1 in which the stannic chloride catalyst is dissolved in propyl chloride and wherein the gas being operated upon is scrubbed with the solution of stannic chloride in propyl chloride.

4. A process according to claim 1 in which the stannic chloride catalyst is dissolved in propyl chloride; and wherein the reaction is conducted at a temperature in the neighborhood of zero degrees centigrade.

5. The process of manufacturing propyl chloride from propylene, which comprises contacting propylene and hydrogen chloride in the presence of a catalyst consisting of stannic chloride.

6. The process of manufacturing propyl chloride from propylene, which comprises contacting propylene and hydrogen chloride in the presence of a catalyst consisting of stannic chloride, said catalyst being dissolved in propyl chloride.

ERIC B. HJERPE.
WILLIAM A. GRUSE.